United States Patent
Spears et al.

(10) Patent No.: US 9,810,359 B2
(45) Date of Patent: Nov. 7, 2017

(54) PIPE COUPLING

(71) Applicant: SPEARS MANUFACTURING CO., Sylmar, CA (US)

(72) Inventors: Wayne Spears, Sylmar, CA (US); Robert Wayne Spears, II, Sylmar, CA (US); David E. Littleton, Santa Clara, CA (US)

(73) Assignee: Spears Manufacturing Co., Sylmar, CA (US)

( * ) Notice: Subject to any disclaimer, the term of this patent is extended or adjusted under 35 U.S.C. 154(b) by 0 days.

(21) Appl. No.: 14/876,791

(22) Filed: Oct. 6, 2015

(65) Prior Publication Data
US 2016/0097477 A1    Apr. 7, 2016

Related U.S. Application Data

(60) Provisional application No. 62/060,411, filed on Oct. 6, 2014.

(51) Int. Cl.
*F16L 37/00* (2006.01)
*F16L 37/091* (2006.01)

(52) U.S. Cl.
CPC ................... *F16L 37/091* (2013.01)

(58) Field of Classification Search
USPC ................... 285/339–343, 345, 95, 382–383
See application file for complete search history.

(56) References Cited

U.S. PATENT DOCUMENTS

| | | | | |
|---|---|---|---|---|
| 2,779,610 A | * | 1/1957 | Risley | F16L 19/086 285/323 |
| 3,312,483 A | * | 4/1967 | Leadbetter | F16L 19/086 285/340 |
| 3,312,484 A | * | 4/1967 | Davenport | F16L 19/086 285/340 |
| 3,429,596 A | * | 2/1969 | Marshall | F16L 19/086 285/27 |
| 3,591,208 A | * | 7/1971 | Nicolaus | F16L 19/086 285/250 |
| 3,814,136 A | | 6/1974 | Johnson et al. | |

(Continued)

OTHER PUBLICATIONS

Flo Control Quality Products by NDS, products Catalog, Sep. 2014, 32 pages.

(Continued)

*Primary Examiner* — Aaron Dunwoody
*Assistant Examiner* — Fannie Kee
(74) *Attorney, Agent, or Firm* — Jeffrey G. Sheldon; Cislo & Thomas LLP

(57) ABSTRACT

Each gripper washer 22 is disposed between a gasket retaining ring 18 and an end connector 14. The gripper washers 22 can be any size and dimension, and made from any material, including but not limited to plastic, polyvinyl chloride, or metal. The gripper washers 22 are a washer-like structure, typically a metallic structure that comprises an interior diameter, a concentric inner periphery and an exterior periphery 24. Each gripper washer 22 is disposed between a gasket retaining ring 18 and an end connector 14, such that the exterior periphery 24 of the gripper washer 22 is in contact with, or in close proximity to, the shoulder 20 of the gasket retaining ring 18.

20 Claims, 1 Drawing Sheet

(56) References Cited

U.S. PATENT DOCUMENTS

| | | | |
|---|---|---|---|
| 4,062,572 A * | 12/1977 | Davis | F16L 19/08 |
| | | | 285/249 |
| 4,072,328 A | 2/1978 | Elliott | |
| 4,288,113 A | 9/1981 | Saulnier | |
| 4,372,586 A * | 2/1983 | Rosenberg | F16L 37/10 |
| | | | 285/148.27 |
| 4,445,714 A * | 5/1984 | Kisiel, III | F16L 47/04 |
| | | | 285/23 |
| 4,919,457 A | 4/1990 | Moretti | |
| 4,932,686 A | 6/1990 | Anderson, Jr. | |
| 5,024,469 A | 6/1991 | Aitken et al. | |
| 5,487,572 A | 1/1996 | Combot-Courrau et al. | |
| 5,553,901 A | 9/1996 | Serot | |
| 5,911,443 A | 6/1999 | Le Quere | |
| 6,056,326 A | 5/2000 | Guest | |
| 6,450,550 B1 | 9/2002 | Cornwell | |
| 6,464,266 B1 * | 10/2002 | O'Neill | B29C 65/08 |
| | | | 285/340 |
| 7,063,359 B2 | 6/2006 | Vallee | |
| 7,121,593 B2 | 10/2006 | Snyder, Sr. et al. | |
| 7,530,606 B1 | 5/2009 | Yang | |
| 7,841,630 B1 * | 11/2010 | Auray | F16L 5/06 |
| | | | 285/151.1 |
| 8,313,607 B2 | 11/2012 | Quinn | |
| 8,480,134 B2 | 7/2013 | Crompton et al. | |
| 8,491,012 B2 * | 7/2013 | LeQuere | F16L 37/091 |
| | | | 285/340 |
| 8,608,205 B2 | 12/2013 | Lai | |
| 8,764,066 B1 | 7/2014 | Rice et al. | |
| 8,844,981 B1 | 9/2014 | Crompton et al. | |
| 2007/0075542 A1 | 4/2007 | Glaze et al. | |
| 2011/0101685 A1 | 5/2011 | Lai | |
| 2012/0326439 A1 | 12/2012 | Bogert et al. | |
| 2014/0062078 A1 | 3/2014 | Weissmann | |
| 2015/0345683 A1 | 12/2015 | Crompton et al. | |
| 2016/0131289 A1 | 5/2016 | Spears et al. | |
| 2016/0131296 A1 | 5/2016 | Spears et al. | |

OTHER PUBLICATIONS

USPTO, Non-Final Office Action on the Merits issued in related Spears et al. U.S. Appl. No. 14/932,452 on Nov. 4, 2016 (21 pages).
USPTO, Final Office Action on the Merits issued in related Spears et al. U.S. Appl. No. 14/932,452 on May 9, 2016 (11 pages).
USPTO, Non-Final Office Action on the Merits issued in related Spears et al. U.S. Appl. No. 14/932,452 on Apr. 1, 2016, 17 pages.
USPTO, Final Office Action on the Merits issued in related Spears et al. U.S. Appl. No. 14/932,510 on Jul. 7, 2016 (9 pages).
USPTO, Non-Final Office Action on the Merits issued in related Spears et al. U.S. Appl. No. 14/932,510 on Mar. 11, 2016 (10 pages).

* cited by examiner

PIPE COUPLING

CROSS-REFERENCE TO RELATED APPLICATIONS

This application claims the benefit of U.S. Provisional Patent Application No. 62/060,411 titled "Pipe Coupling," filed Oct. 6, 2014, the entirety of which is incorporated herein by reference.

BACKGROUND OF THE INVENTION

Pipe couplings for joining two sections of pipe are well known. Such pipe couplings generally comprise a cylindrical body for accepting and retaining an end of each pipe section, an end connector attached to each end of the body by threads and a gasket disposed between the body and each pipe section. Each gasket is retained by an end connector.

In a typical prior art pipe coupling, axial movement of the body with respect to the pipe sections relies upon friction between the gaskets and the exterior surface of the pipe sections. The gaskets can be made from a material having a high coefficient of friction (such as rubber) or can be designed with a taper that tightens down against the pipe. Gasket friction, however, is relatively weak, so that such pipe couplings cannot resist strong axial movements.

In some applications, additional axial movement restraint is provided by a gripper washer disposed between each gasket retaining ring and its associated end connector. A gripper washer is a washer-like structure, typically a metallic structure, whose inner periphery comprises a large plurality of gripping fingers. The griping fingers are bent inwardly at an angle. The interior diameter of the gripper washer is chosen be slightly smaller than the outside diameter of the pipe sections. In prior art pipe couplings employing gripper washers, the outer periphery of each gripping washer is retained by the inner surface of an end connector. When a pipe section is thrust into one end of the body, the pipe section slips smoothly along the gripping fingers of the gripper washer. Once fully disposed within the body, however, the pipe section cannot be slid in a reverse direction relative to the gripping fingers. Thus, the gripping fingers retain the pipe section firmly to the body.

A problem arises when a pipe coupling relying on gripper washers is made from CPVC or other material which is "notch sensitive." Notch sensitivity means that small cuts in the surface of the part can propagate into large cracks as a result of stress applied to the part. Notch sensitivity is a general term typically measured as the reduction of impact strength as determined by Izod impact testing (ASTM D256). Notches, however, also contribute significantly to fatigue failures in many materials, metals and plastics included. When a pipe coupling relying on gripper washers is made from a notch-sensitive material, the narrow outer peripheral edge of the gripper washer continuously contacts the inner surface of an end connector, thereby tending to cause the rapid failure of the end connector. If the end connector were to fracture, the pipe would come out of the body resulting in catastrophic failure.

Accordingly, there is a need for an improved gripper washer-containing pipe coupling which avoids this problem in the prior art. The present invention satisfies this need.

SUMMARY OF THE INVENTION

According to one embodiment of the present invention, there is provided a pipe coupling comprising a) a cylindrical body for accepting and retaining ends of a pair of spaced apart pipe sections, the cylindrical body comprising two opposed ends, the two opposed ends each comprising an interior surface; b) an end connector attached to each opposed end of the cylindrical body; c) a gasket disposed within an indentation defined within the interior surface of each of the opposed ends of the cylindrical body; d) a gasket retaining ring disposed between each end connector and gasket, wherein the gasket retaining ring comprises a shoulder; and e) a gripper washer comprising an exterior periphery, the gripper washer disposed between each gasket retaining ring and end connector; wherein the gasket retaining ring shoulder is adjacent to the exterior periphery of the gripper washer. In one embodiment, the end connectors are attached to each end of the body by one or more of the following: friction welding, sonic welding, or a suitable adhesive. In one embodiment, the gasket comprises an O-ring. In another embodiment, the gasket retaining ring is made from plastic or metal. In another embodiment, the gasket retaining ring is made from the same material as the end connectors. In another embodiment, the gripper washer comprises a washer-like structure, wherein the washer-like structure comprises an interior diameter and an interior periphery, and a plurality of gripping fingers. In another embodiment, the gripping fingers are metallic.

According to another embodiment of the present invention, there is provided a method of using a pipe coupling, wherein the method comprises the steps of: a) providing a pipe coupling according to the present invention; b) inserting one of the ends of the pair of spaced apart pipe sections into one of the two opposed ends of the body; and c) inserting the other of one of the ends of the pair of spaced apart pipe sections into the other one of the two opposed ends of the body.

DRAWINGS

These and other features, aspects and advantages of the present invention will become better understood with reference to the following description, appended claims, and accompanying drawings where:

DETAILED DESCRIPTION OF THE INVENTION

Figure 1:
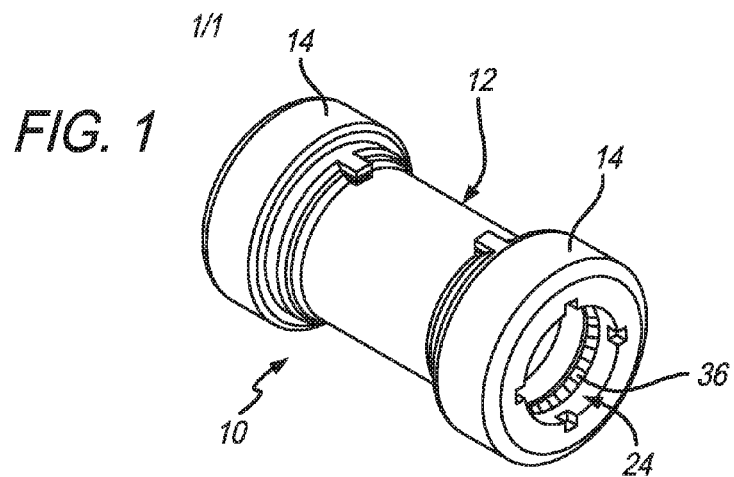
FIG. 1 is a perspective view of a pipe coupling having features of the invention.

The following discussion describes in detail one embodiment of the invention and several variations of that embodiment. This discussion should not be construed, however, as limiting the invention to those particular embodiments. Practitioners skilled in the art will recognize numerous other embodiments as well.

Definitions

As used herein, the following terms and variations thereof have the meanings given below, unless a different meaning is clearly intended by the context in which such term is used.

The terms "a," "an," and "the" and similar referents used herein are to be construed to cover both the singular and the plural unless their usage in context indicates otherwise.

As used in this disclosure, the term "comprise" and variations of the term, such as "comprising" and "comprises," are not intended to exclude other additives, components, integers, ingredients or steps.

The Invention

In a preferred embodiment of the present invention, there is provided a pipe coupling 10 comprising a body 12, two end connectors 14, two gaskets 16, two gasket retaining rings 18 each comprising a shoulder 20, and two gripper washers 22 each comprising an exterior periphery 24. In the invention, the shoulders 20 of the gasket retaining rings 18 are adjacent to the exterior periphery 24 of the gripper washers 22. By "adjacent," it is meant that the gripper washers 22 can be in contact with or in close proximity to the shoulders 20.

The body 12 can be any size and dimension, and made from any material, including but not limited to plastic, polyvinyl chloride, rubber or metal. The cross-section of the body 12 can be any shape, but preferably the cross-section of the body 12 is circular and the body 12 is cylindrical. The body 12 comprises an internal surface 26 and two opposed ends 28. The body 12 defines a linear passageway between the two opposed ends 28 of the body 12. The linear passageway typically has a circular interior diameter. The two opposed ends 28 each comprise an indentation 30 in the internal surface 26. The body 12 accepts and retains the ends of a pair of spaced apart pipe sections 32.

The pair of spaced apart pipe sections 32 can be any size and dimension, and made from any material including but not limited to plastic, polyvinyl chloride, rubber or metal. The cross-section of the pair of spaced apart pipe sections 32 can be any shape, but preferably correspond to the cross-sectional shape of the body 12. The pipe sections 32 each comprise an exterior surface 34 and an outside diameter.

Figure 2:
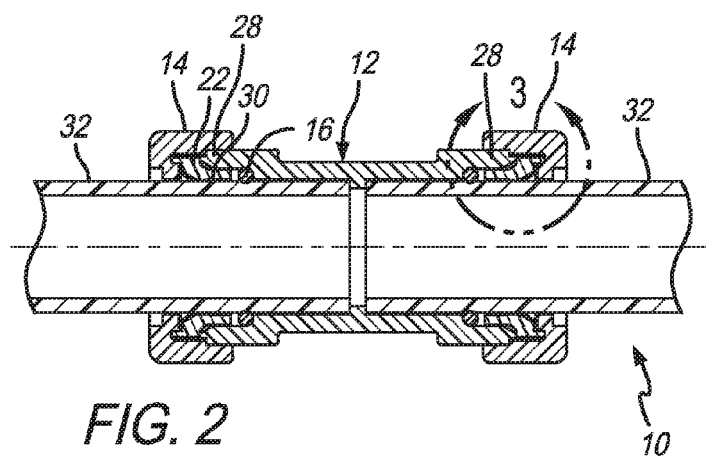
FIG. 2 is a cross-sectional view of the pipe coupling illustrated in FIG. 1.
Figure 3:
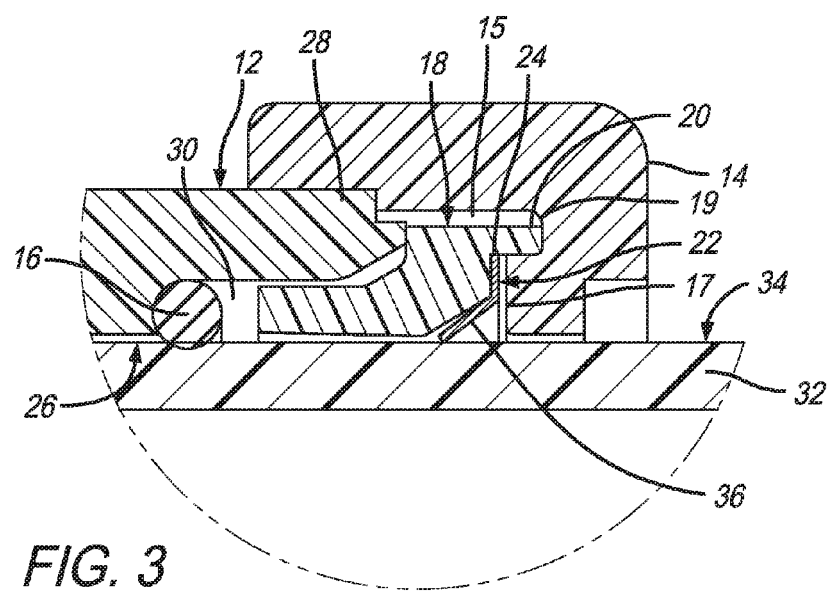
FIG. 3 is a cross-sectional detail view of a portion of the pipe coupling illustrated in FIG. 2.

The end connectors 14 can be any size and dimension, and made from any material, including but not limited to plastic, polyvinyl chloride, rubber or metal. An end connector 14 is attached to each of the two opposed ends 28 of the body 12. The end connectors 14 are attached to the body 12 by any means, including but not limited to friction welding, sonic welding or a suitable adhesive. As shown in FIGS. 2 and 3, the end connectors 14 each also include a radially facing interior surface 15 and an axially facing interior surface 17 that includes a groove 19 disposed therein.

The gaskets 16 seal the body 12 to the ends of the pipe sections 32. The gaskets 16 can any size and dimension, and made from any material, including but not limited to plastic, rubber, metal, silicone or elastomeric material. Many known elastomeric materials can be used in the gaskets 16 such as EPDM (ethylene-propylene elastomer), neoprene, silicone, buna-N, Hypalon®, (Hypalon is a trademark for chlorosulfonated polyethylene (CSPE) synthetic rubber (CSM)) polyurethane, Santoprene®, (Santoprene is a trademark for Thermoplastic Elastomer (TPE) Thermoplastic Vulcanate (TPV)), vinyl and Viton® (Viton is a trademark for FKM (fluoroelastomer)). Preferably the gaskets 16 are in the form of an O-ring. The gaskets 16 are disposed within the indentations 30 defined within the internal surface 26 of the body 12, between the body 12 and the exterior surface 34 of the pipe sections 32.

The gasket retaining rings 18 are disposed between each end connector 14 and each corresponding gasket 16. The gasket retaining rings 18 retain the gaskets 16, and each gasket retaining ring 18 comprises a continuous shoulder 20. The gasket retaining rings 18 can be made from a variety of materials, including but not limited to plastic, polyvinyl chloride, rubber, metal, etc. The gasket retaining rings 18 can be made from the same material as the end connectors 14 but do not have to be. The gasket retaining rings 18 can be made from a harder, less notch sensitive material. Alternatively, the gasket retaining rings 18 can be made from a softer more cushioning material. Having the same notch sensitivity as the end connectors 14 is not a problem since the gasket retaining rings 18 have no tension axial stress. Thus, the notch sensitivity has less stress to magnify, and the radial stress applied to the gasket retaining ring 18 by the gripper washer 22 is reduced by any yielding or fracturing. As shown in FIGS. 2 and 3, the shoulders 20 of the gasket retaining rings 18 are each disposed within the groove 19 of their corresponding end connector 14.

The shoulders 20 of the gasket retaining rings 18 contact and retain the exterior periphery 24 of the gripper washers 22. The shoulders 20 can be any size and any dimension, and made from any material including but not limited to plastic, polyvinyl chloride, or metal. The shoulders 20 of the gasket retaining rings 18 act as protection for the end connectors 14 from the narrow edges of the exterior peripheries 24 of the gripper washers 22. Thus, protecting the end connectors 14 from failure, and, ultimately protecting the integrity of the pipe coupling 10. As shown in FIGS. 2 and 3, only the shoulders 20 of the gasket retaining rings 18 prevent their respective gripper washers 22 from contacting the radially facing interior surface 15 of their respective end connectors 14. It should be noted that without the shoulders 20, the narrow exterior peripheries 24 of the gripper washers 22 would contact the radially facing interior surfaces 15 of their respective end connectors 14.

The gasket retaining rings 18 are used to retain the radial stress of the gripper washers 22, as each gripper washer 22 digs into the pipe section 32 and tries to expand and invert. Since the end connectors 14 have the full axial stress of the pipe section 32, as well as the radial stresses applied by the gripper washer 22 and by the body 12 (as a result of hoop stress), if the gasket retaining rings 18 were to fracture, they would likely have little effect on the integrity of the pipe coupling 10. Once a gripper washer 22 establishes a "grip" on the pipe section 32, significantly less radial restraint is required. Also, any fracturing of the gasket retaining rings 18 will not cause a leak. Still further, any fracturing of the gasket retaining rings 18 does not reduce the fittings resistance to axial loading unless the gripper washers 22 were to expand and lose "grip"—allowing the pipe section 32 to slip.

Each gripper washer 22 is disposed between a gasket retaining ring 18 and an end connector 14. The gripper washers 22 can be any size and dimension, and made from any material, including but not limited to plastic, polyvinyl chloride, or metal. The gripper washers 22 are a washer-like structure, typically a metallic structure that comprises an interior diameter, an inner periphery and an exterior periphery 24. Each gripper washer 22 is disposed between a gasket retaining ring 18 and an end connector 14, such that the exterior periphery 24 of the gripper washer 22 is adjacent to the shoulder 20 of the gasket retaining ring 18.

The inner peripheries of the gripper washers 22 comprise a large plurality of gripping fingers 36 which have been bent inwardly at an angle. The interior diameters of the gripper washers 22 are chosen to be slightly smaller than the outside diameter of the pair of spaced apart pipe sections 32 for which the pipe coupling 10 is to be used. Thus, when a pipe section 32 is thrust into one end of the body 12, it slips smoothly along the plurality of gripping fingers 36 of the gripper washer 22. Once fully disposed within the body 12, however, the pipe section 32 cannot be slid in a reverse direction relative to the plurality of gripping fingers 36. Thus, gripping fingers 36 retain the pipe section 32 firmly to the body 12.

In another embodiment of the present invention, there is provided a method of using the pipe coupling 10 comprising the steps of: a) providing the pipe coupling 10; b) inserting one of the ends of the pair of spaced apart pipe sections 32 into one of the two opposed ends 28 of the body 12; and c) inserting the other of one of the ends of the pair of spaced apart pipe sections 32 into the other one of the two opposed ends 28 of the body 12.

Having thus described the invention, it should be apparent that numerous structural modifications and adaptations may be resorted to without departing from the scope and fair meaning of the instant invention as set forth herein above and described herein below by the claims.

What is claimed is:

1. A pipe coupling comprising:
   a) a cylindrical body for accepting and retaining ends of a pair of spaced apart pipe sections, the cylindrical body comprising two opposed ends, the two opposed ends each comprising an interior surface;
   b) an end connector attached to each of the opposed ends of the cylindrical body, each end connector comprising an axially facing interior surface and a radially facing interior surface, the axially facing interior surface having a groove formed therein;
   c) a gasket disposed within an indentation defined within the interior surface of each of the opposed ends of the cylindrical body;
   d) a gasket retaining ring disposed between each end connector and the corresponding gasket, each gasket retaining ring having a shoulder disposed within the groove of the corresponding end connector; and
   e) a gripper washer disposed between each gasket retaining ring and end connector, each gripper washer comprising a concentric interior periphery composed of a plurality of gripping fingers;
   wherein the shoulder of each of the gasket retaining rings prevents the corresponding gripper washer from contacting the radially facing interior surface of the corresponding end connector.

2. The pipe coupling of claim 1, wherein the end connectors are attached to each end of the body by one or more of the following: friction welding, sonic welding or an adhesive.

3. The pipe coupling of claim 1, wherein each of the gaskets comprises an O-ring.

4. The pipe coupling of claim 1, wherein the gasket retaining ring is made from plastic or metal.

5. The pipe coupling of claim 4, wherein the gasket retaining ring is formed from polyvinyl chloride.

6. The pipe coupling of claim 1, wherein the gasket retaining rings and the end connectors are made from a same material.

7. The pipe coupling of claim 1, wherein the gripping fingers are metallic.

8. The pipe coupling of claim 1, wherein each groove formed in the axially facing interior surface of each end connector is annular.

9. The pipe coupling of claim 1, wherein only the shoulder of each of the gasket retaining rings prevents the corresponding gripper washer from contacting the radially facing interior surface of the corresponding end connector.

10. A method of using a pipe coupling, the method comprising the steps of:
    a) providing the pipe coupling according to claim 1;
    b) inserting one of the ends of the pair of spaced apart pipe sections into one of the two opposed ends of the body; and
    c) inserting the other of one of the ends of the pair of spaced apart pipe sections into the other one of the two opposed ends of the body.

11. The method of claim 10, wherein the end connectors of the pipe coupling of step a) are attached to each end of the body by one or more of the following: friction welding, sonic welding or an adhesive.

12. The method of claim 10, wherein each of the gaskets of the pipe coupling of step a) comprises an O-ring.

13. The method of claim 10, wherein the gasket retaining rings of the pipe coupling of step a) are made from plastic or metal.

14. The method of claim 13, wherein the gasket retaining rings of the pipe coupling of step a) are formed from polyvinyl chloride.

15. The method of claim 13, wherein the gasket retaining rings and the end connectors of the pipe coupling of step a) are formed from polyvinyl chloride.

16. The method of claim 10, wherein the gripping fingers of the pipe coupling of step a) are metallic.

17. A pipe coupling comprising:
    a) a cylindrical body for accepting and retaining ends of a pair of spaced apart pipe sections, the cylindrical body comprising two opposed ends, the two opposed ends each comprising an interior surface;
    b) an end connector attached to each of the opposed ends of the cylindrical body, each end connector comprising an axially facing interior surface and a radially facing interior surface, the axially facing interior surface having an annular groove formed therein;
    c) a gasket disposed within an indentation defined within the interior surface of each of the opposed ends of the cylindrical body;
    d) a gasket retaining ring disposed between each end connector and the corresponding gasket, each gasket retaining ring having a shoulder disposed within the groove of the corresponding end connector; and
    e) a gripper washer disposed between each gasket retaining ring and end connector, each gripper washer comprising a concentric interior periphery composed of a plurality of gripping fingers;
    wherein the shoulder of each of the gasket retaining rings prevents the corresponding gripper washer from contacting the radially facing interior surface of the corresponding end connector and the gasket retaining rings and the end connectors are made from a same material.

18. The pipe coupling of claim 17, wherein only the shoulder of each of the gasket retaining rings prevents the corresponding gripper washer from contacting the radially facing interior surface of the corresponding end connector.

19. A pipe coupling comprising:
    a) a cylindrical body for accepting and retaining ends of a pair of spaced apart pipe sections, the cylindrical body comprising two opposed ends, the two opposed ends each comprising an interior surface;
    b) an end connector attached to each of the opposed ends of the cylindrical body, each end connector comprising an axially facing interior surface and a radially facing interior surface, the axially facing interior surface having a groove formed therein;
    c) a gasket disposed within an indentation defined within the interior surface of each of the opposed ends of the cylindrical body;
    d) a gasket retaining ring disposed between each end connector and the corresponding gasket, each gasket retaining ring having a shoulder disposed within the groove of the corresponding end connector; and e) a gripper washer disposed between each gasket retaining ring and end connector, each gripper washer comprising a concentric interior periphery composed of a plurality of gripping fingers;

wherein the shoulder of each of the gasket retaining rings prevents the corresponding gripper washer from contacting the radially facing interior surface of the corresponding end connector and the gasket retaining rings and the end connectors are made from polyvinyl chloride.

20. The pipe coupling of claim 19, wherein only the shoulder of each of the gasket retaining rings prevents the corresponding gripper washer from contacting the radially facing interior surface of the corresponding end connector.

* * * * *